US012802973B2

(12) United States Patent
Fu et al.

(10) Patent No.: US 12,802,973 B2
(45) Date of Patent: Nov. 17, 2026

(54) COMPOSITE LITHIUM METAL NEGATIVE ELECTRODE, PREPARATION METHOD THEREOF, LITHIUM SECONDARY BATTERY, AND APPARATUS

(71) Applicant: CONTEMPORARY AMPEREX TECHNOLOGY (HONG KONG) LIMITED, Hong Kong (CN)

(72) Inventors: Ang Fu, Ningde City (CN); Chengyong Liu, Ningde City (CN); Yongsheng Guo, Ningde City (CN); Meng Cheng, Ningde City (CN); Shengyuan Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 764 days.

(21) Appl. No.: 18/062,578

(22) Filed: Dec. 7, 2022

(65) Prior Publication Data

US 2023/0107697 A1 Apr. 6, 2023

Related U.S. Application Data

(63) Continuation of application No. PCT/CN2020/099371, filed on Jun. 30, 2020.

(51) Int. Cl.
*H01M 4/38* (2006.01)
*H01M 4/02* (2006.01)
(Continued)

(52) U.S. Cl.
CPC ......... *H01M 4/382* (2013.01); *H01M 4/0416* (2013.01); *H01M 4/0471* (2013.01);
(Continued)

(58) Field of Classification Search
CPC ..... H01M 4/016; H01M 4/0471; H01M 4/382
See application file for complete search history.

(56) References Cited

U.S. PATENT DOCUMENTS

2019/0393510 A1* 12/2019 He ........................ H01M 4/628
2020/0343533 A1* 10/2020 Herle .................... H01M 4/661
(Continued)

FOREIGN PATENT DOCUMENTS

CN 106531995 A * 3/2017 ........ H01M 10/0525
CN 108365200 A 8/2018
(Continued)

OTHER PUBLICATIONS

CN110931712B English machine translation (Year: 2025).*
(Continued)

*Primary Examiner* — Armindo Carvalho, Jr.
(74) *Attorney, Agent, or Firm* — K&L Gates LLP

(57) ABSTRACT

A composite lithium metal negative electrode, a preparation method thereof, a lithium secondary battery, and an apparatus are provided. In some embodiments, the composite lithium metal negative electrode includes lithium metal and a lithium buffer layer on at least one surface of the lithium metal. The lithium buffer layer includes a porous framework and a lithiophilic material, where the porous framework is a conductive porous framework, the lithiophilic material is distributed in the porous framework, and a distribution density of the lithiophilic material in the porous framework decreases in a continuous gradient in a direction of the lithium buffer layer away from the lithium metal. A conductive lithium buffer layer with a continuous gradient change in lithiophilicity is added on a surface of the lithium metal negative electrode.

13 Claims, 6 Drawing Sheets

1-A

1-B

(51) Int. Cl.
*H01M 4/04* (2006.01)
*H01M 10/0525* (2010.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2021/0313590 | A1 | 10/2021 | Behrendt | |
| 2022/0102703 | A1* | 3/2022 | Sada | H01M 4/0435 |

FOREIGN PATENT DOCUMENTS

| | | | | | |
|---|---|---|---|---|---|
| CN | 109546141 | A | | 3/2019 | |
| CN | 109643808 | A | | 4/2019 | |
| CN | 109713224 | A | | 5/2019 | |
| CN | 209747642 | U | | 12/2019 | |
| CN | 110660969 | A | * | 1/2020 | H01M 4/661 |
| CN | 110890530 | A | * | 3/2020 | H01M 4/362 |
| CN | 110931712 | A | | 3/2020 | |
| CN | 110993954 | A | | 4/2020 | |
| CN | 111333041 | A | * | 6/2020 | C01B 32/914 |
| CN | 110931712 | B | * | 1/2021 | H01M 4/628 |
| JP | 2010199083 | A | | 9/2010 | |
| KR | 20190064206 | A | | 6/2019 | |
| KR | 20200076006 | A | * | 6/2020 | C23C 8/24 |

OTHER PUBLICATIONS

CN-110890530-A English machine translation (Year: 2026).*
CN108365200A English machine translation (Year: 2026).*
KR-20200076006-A English machine translation (Year: 2026).*
CN-110660969-A English machine translation (Year: 2026).*
CN-106531995-A English machine translation (Year: 2026).*
CN-111333041-A English machine translation (Year: 2026).*
International Search Report received in International Application PCT/CN2020/099371, mailed Apr. 1, 2021.
Written Opinion received in International Application PCT/CN2020/099371, mailed Apr. 1, 2021.
Huimin Zhang, "Lithiophilic-lithiophobic gradient interfacial layer for a highly stable lithium metal anode", published on Natural Communications, vol. 9, No. 1, Sep. 13, 2018, ISSN: 2041-1723.
Notice of Allowance (with English Machine Translation), mailed Mar. 20, 2025, for corresponding Chinese Patent Application Serial No. 202080100246.X.
Office Action (with English Machine Translation), mailed Jan. 18, 2025, for corresponding Chinese Patent Application Serial No. 202080100246.X.
Office Action (with English Machine Translation), mailed Jun. 14, 2024, for corresponding Chinese Patent Application Serial No. 202080100246.X.

* cited by examiner

COMPOSITE LITHIUM METAL NEGATIVE ELECTRODE, PREPARATION METHOD THEREOF, LITHIUM SECONDARY BATTERY, AND APPARATUS

CROSS-REFERENCE TO RELATED APPLICATIONS

The present disclosure is a continuation of International Application No. PCT/CN2020/099371, filed on Jun. 30, 2020, which is hereby incorporated by reference in its entirety.

TECHNICAL FIELD

The present disclosure relates to the field of batteries, and specifically, to a composite lithium metal negative electrode, a preparation method thereof, a lithium secondary battery, and an apparatus.

BACKGROUND

Lithium metal has been deemed as the "holy grail" of negative electrode materials for next-generation high-energy-density secondary batteries due to its advantages such as high theoretical specific capacity, low reduction potential, minimum atomic radius, and low density.

However, industrial applications of lithium metal negative electrodes still face challenges, among which lithium dendrites are a prominent technical problem. During repeated deposition and precipitation of lithium ions, lithium dendrites are inevitably generated. Growth of lithium dendrites not only causes irreversible loss of lithium elements, resulting in reduced cycling performance of a battery, but also may pierce a separator, leading to short-circuiting of the battery or even a fire, posing great potential risks to use of lithium metal secondary batteries. Therefore, suppressing the growth of lithium dendrites has become an urgent problem to be resolved.

SUMMARY

In some embodiments, the present disclosure provides a composite lithium metal negative electrode, a preparation method thereof, a lithium secondary battery, and an apparatus.

According to a first aspect, the present disclosure provides a composite lithium metal negative electrode, including lithium metal and a lithium buffer layer on at least one surface of the lithium metal, where the lithium buffer layer includes a porous framework and a lithiophilic material, the porous framework is a conductive porous framework, and the lithiophilic material is selected from one or more of the following substances with lithiophilicity: metal oxides, non-metal oxides, metal sulfides, non-metal sulfides, metal phosphides, non-metal phosphides, metal nitrides, or non-metal nitrides. The lithiophilic material is distributed in the porous framework, and a distribution density of the lithiophilic material in the porous framework decreases in a continuous gradient in a direction of the lithium buffer layer away from the lithium metal.

In the composite lithium metal negative electrode provided in the present disclosure, in the direction of the lithium buffer layer away from the lithium metal, a contact angle of molten lithium on a cross section of the lithium buffer layer increases in a continuous gradient. A size of the contact angle of molten lithium on the cross section of the lithium buffer layer is closely related to the lithiophilicity, and indirectly reflects the distribution density of the lithiophilic material in the porous framework. That in the direction of the lithium buffer layer away from the lithium metal, a contact angle of molten lithium on a cross section of the lithium buffer layer increases in a continuous gradient indicates that the distribution density of the lithiophilic material in the porous framework decreases in a continuous gradient.

In the composite lithium metal negative electrode provided in the present disclosure, the lithium buffer layer has an inner surface close to the lithium metal and an outer surface away from the lithium metal, the contact angle of molten lithium on the inner surface of the lithium buffer layer is 0°-90°, and the contact angle of molten lithium on the outer surface of the lithium buffer layer is 90°-180°. In the present disclosure, when the contact angle of molten lithium on the inner surface of the lithium buffer layer and the contact angle of molten lithium on the outer surface of the lithium buffer layer are within the foregoing ranges, the lithium buffer layer has a good driving force to induce the lithium metal to spontaneously deposit from a lithiophobic side to a lithiophilic side, having a better effect on suppressing growth of lithium dendrites.

Further, an angle difference $\Delta\theta$ between the contact angle of molten lithium on the outer surface of the lithium buffer layer and the contact angle of molten lithium on the inner surface of the lithium buffer layer is 10°-180°. Preferably, $\Delta\theta$ is 45°-135°. With $\Delta\theta$ in the defined range in the present disclosure, an obvious change of lithiophilic gradient between the inner and outer surfaces can effectively drive and induce deposition of the lithium metal from the lithiophobic side to the lithiophilic side, and effectively improve deposition utilization of an internal space of the porous framework of the lithium buffer layer.

In the composite lithium metal negative electrode provided in the present disclosure, the lithiophilic material is selected from one or more of zinc oxide, zinc sulfide, zinc phosphide, zinc nitride, aluminum oxide, aluminum nitride, magnesium oxide, magnesium sulfide, magnesium nitride, copper phosphide, copper nitride, silver oxide, silver sulfide, and boron nitride, and preferably, zinc oxide or silver oxide. The foregoing substances all have good lithiophilicity, and are advantageous choices for the lithiophilic material in the lithium buffer layer of the present disclosure.

In the composite lithium metal negative electrode provided in the present disclosure, the porous framework satisfies at least one of the following conditions (1) to (3): (1) a thickness of the porous framework is 1-10,000 μm, and preferably, 50-1,000 μm; (2) a porosity of the porous framework is 30%-95%; and (3) a pore size of the porous framework is 0.01-10 μm. With the thickness of the porous framework in the foregoing range, the lithium buffer layer can have a good strength and can provide enough internal space for deposition of the lithium metal, which is beneficial to improvement of long-cycling performance of the battery. When the porosity of the porous framework is 30%-95%, and/or the pore size of the porous framework is 0.01-10 μm, the porous framework has a high specific surface area, which is beneficial to deposition and deintercalation of lithium ions in the framework and also provides sufficient space for deposition of the lithium metal.

According to a second aspect, the present disclosure provides a preparation method of the composite lithium metal negative electrode according to the first aspect, including the following steps: dissolving a precursor of a lithiophilic material in a solvent to obtain a solution of the precursor of the lithiophilic material; soaking one surface of a porous framework substrate in the solution of the precursor of the lithiophilic material, and taking out the substrate for drying, to obtain a porous framework substrate loaded with the precursor of the lithiophilic material; subjecting the porous framework substrate loaded with the precursor of the lithiophilic material to a sintering treatment and to an optional sulfiding treatment, phosphating treatment, or nitriding treatment, to obtain a lithium buffer layer; and pressing the lithium buffer layer onto at least one surface of the lithium metal, and integrating the surface soaked in the solution of the precursor of the lithiophilic material with the lithium metal, to prepare a composite lithium metal negative electrode.

In the preparation method of the composite lithium metal negative electrode provided in the present disclosure, the precursor of the lithiophilic material is selected from an organic salt or inorganic salt containing zinc, aluminum, magnesium, copper, silver or boron, where the organic salt is preferably selected from bisfluorosulfonimide salt and/or bistrifluoromethylsulfonimide salt; and the inorganic salt is preferably selected from one or more of acetate, nitrate, sulfate, thiosulfate, or meta-aluminate.

In the preparation method of the composite lithium metal negative electrode provided in the present disclosure, the solvent for dissolving the precursor of the lithiophilic material is selected from one or more of water, ethanol, DMF, or NMP.

In the preparation method of the composite lithium metal negative electrode provided in the present disclosure, the porous framework substrate satisfies at least one of the following conditions (1) to (3): (1) a thickness of the porous framework substrate is 1-10,000 μm, and preferably, 50-1,000 μm; (2) a porosity of the porous framework substrate is 30%-95%; and (3) a pore size of the porous framework substrate is 0.01-10 μm.

In the preparation method of the composite lithium metal negative electrode provided in the present disclosure, the porous framework substrate is selected from one or more of melamine foam, polyurethane, polyethylene, polystyrene, polyvinyl chloride, polypropylene, polyacetylene, polythiophene, polypyrrole, polyaniline, pure carbon, carbon cloth, or carbon paper.

In the preparation method of the composite lithium metal negative electrode provided in the present disclosure, one surface of the porous framework substrate is soaked in the solution of the precursor of the lithiophilic material for 2-360 minutes, and preferably, for 30-60 minutes. The range of soaking time provided in the present disclosure helps to ensure that a rate of change of lithiophilic gradient in the lithium buffer layer is within an appropriate range, thereby effectively playing a role in improving the cycling performance of the lithium secondary battery.

In the preparation method of the composite lithium metal negative electrode provided in the present disclosure, the sintering treatment is performed in an inert gas environment. A sintering time is preferably 0.5-6 hours, and more preferably, 1-2 hours. A sintering temperature is preferably 400-2,500° C., and more preferably, 800-1,000° C. The foregoing sintering time and sintering temperature conditions may make the porous framework achieve better conductivity and nitrogen in the porous framework is not consumed due to excessive sintering.

In addition, in the preparation method of the composite lithium metal negative electrode provided in the present disclosure, after the sintering treatment, an optional sulfiding treatment, phosphating treatment, or nitriding treatment may be further performed.

The sulfiding treatment includes: subjecting a mixture of the lithium buffer layer obtained after the sintering treatment and sulfur powder to sulfiding sintering in an inert gas environment, where preferably, a sulfiding sintering time is 0.5-6 hours, and a sulfiding sintering temperature is 400-1,000° C.

The phosphating treatment includes: subjecting a mixture of the lithium buffer layer obtained after the sintering treatment and phosphorus powder to phosphating sintering in an inert gas environment, where preferably, a phosphating sintering time is 0.5-6 hours, and a phosphating sintering temperature is 400-1,000° C.

The nitriding treatment includes: subjecting the lithium buffer layer obtained after the sintering treatment to nitriding sintering in an $N_2$ or $NH_3$ gas environment; where preferably, a nitriding sintering time is 0.5-6 hours, and a nitriding sintering temperature is 400-1,000° C.

Through the foregoing optional sulfiding, phosphating and nitriding steps, the lithiophilic material in the porous framework may be further transformed from metal oxides or non-metal oxides to metal sulfides, non-metal sulfides, metal phosphides, non-metal phosphides, metal nitrides, or non-metal nitrides. The foregoing sulfides, phosphides, and nitrides can also play a lithiophilic role in guiding lithium metal for uniform deposition in the lithium buffer layer of the present disclosure.

According to a third aspect, the present disclosure provides a lithium secondary battery, including the composite lithium metal negative electrode according to the first aspect of the present disclosure.

According to a fourth aspect, the present disclosure provides an apparatus, including the lithium secondary battery according to the third aspect of the present disclosure, where the lithium secondary battery is used as a power source of the apparatus, or an energy storage unit of the apparatus.

Compared with the prior art, the present disclosure has at least the following advantages.

The composite lithium metal negative electrode provided in the present disclosure includes lithium metal and a lithium buffer layer on at least one surface of the lithium metal. The lithium buffer layer in the present disclosure has two notable features, one is conductivity, and the other is lithiophilicity that changes in a continuous gradient. The applicant believes that: in order to achieve a purpose of suppressing lithium dendrites, although adding a non-conductive buffer layer to a surface of the lithium metal negative electrode can reduce an actual deposition current density of lithium and delay formation of lithium dendrites to some extent, the non-conductive buffer layer is not conducive to deintercalation of the lithium metal from the buffer layer, increases possibility of forming "dead lithium", and is not conducive to a long-cycle life of the battery. However, adding a conductive buffer layer to a surface of the lithium metal negative electrode may cause the lithium metal to gain electrons on the outer surface of the buffer layer, which is not conducive to deposition of the lithium metal. In the present disclosure, a conductive lithium buffer layer with a continuous gradient change in lithiophilicity is added on a surface of the lithium metal negative electrode. The lithium buffer layer can not only provide sufficient migration channels for deposition and deintercalation of lithium ions, to avoid formation of "dead lithium" in the lithium buffer layer, but also induce deposition of the lithium metal from one side with low lithiophilicity to another side with high lithiophilicity, to make full use of the porous space inside the lithium buffer layer, so that lithium metal is uniformly deposited inside the lithium buffer layer, and prevent lithium ions from gaining electrons on the outer surface of the lithium buffer layer, thereby suppressing formation of lithium dendrites and prolonging a cycle life of the lithium metal battery.

In addition, by soaking one surface of the porous framework substrate in the solution of the precursor of the lithiophilic material, the present disclosure achieves a continuous gradient decrease in a distribution density of the lithiophilic material in the porous framework in a thickness direction of the lithium buffer layer. The preparation method of the composite lithium metal negative electrode in the present disclosure is simple and feasible, has stable technical effects, and is suitable for industrial application.

The lithium secondary battery and the apparatus thereof prepared with the composite lithium metal negative electrode in the present disclosure can effectively suppress growth of lithium dendrites and have significantly improved cycle life.

REFERENCE SIGNS ARE AS FOLLOWS

Figure 1:
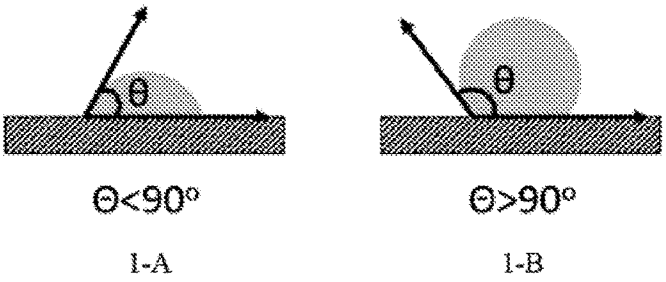
FIG. 1 is a schematic diagram of a contact angle θ of molten lithium on a cross section of a lithium buffer layer in a composite lithium metal negative electrode according to an embodiment of the present disclosure.

1. battery pack;
2. upper box body;
3. lower box body;
4. battery module;
5. lithium secondary battery;
51. housing;
52. electrode assembly; and
53. top cover assembly.

DESCRIPTION OF EMBODIMENTS

The following further describes the present disclosure with reference to specific embodiments. It should be understood that these specific embodiments are merely intended to illustrate the present disclosure but not to limit the scope of the present disclosure.

Composite Lithium Metal Negative Electrode

A first aspect of the present disclosure relates to a composite lithium metal negative electrode, including lithium metal and a lithium buffer layer on at least one surface of the lithium metal. The lithium buffer layer includes a porous framework and a lithiophilic material. The porous framework is a conductive porous framework, and the lithiophilic material is selected from one or more of the following substances with lithiophilicity: metal oxides, non-metal oxides, metal sulfides, non-metal sulfides, metal phosphides, non-metal phosphides, metal nitrides, or non-metal nitrides. The lithiophilic material is distributed in the porous framework, and a distribution density of the lithiophilic material in the porous framework decreases in a continuous gradient in a direction of the lithium buffer layer away from the lithium metal.

"Lithiophilic" used in the present disclosure refers to an affinity for lithium metal. The lithiophilic material is a material having a contact angle of 0°-90° with molten lithium. A lithiophobic material is a material having a contact angle of 90°-180° with molten lithium. Specifically, the lithiophilicity of a material can be tested by the following method: The powdery material is pressed under a specified pressure to form a sheet-like material, after the sheet-like material is dried, molten lithium metal is added dropwise onto a cross section of a lithium buffer layer, and a special measuring instrument for measuring a surface contact angle (such as a commercially available contact angle measuring instrument from Krüss company, Germany) is used for measurement. The contact angle is defined as an included angle between a tangent to a solid-liquid interface and a tangent to a liquid-gas interface at a junction of solid, liquid, and gas phases.

A surface of the lithium metal negative electrode in the present disclosure has a conductive lithium buffer layer with a continuous gradient change in lithiophilicity. The lithium buffer layer can not only provide sufficient migration channels for deposition and deintercalation of lithium ions, to avoid formation of "dead lithium" in the lithium buffer layer, but also induce the lithium metal to spontaneously deposit from a side with low lithiophilicity to a side with high lithiophilicity in the buffer layer, to make full use of the porous space inside the lithium buffer layer to achieve uniform deposition of the lithium metal, and prevent lithium ions from gaining electrons on the outer surface of the lithium buffer layer, thereby suppressing formation of lithium dendrites and prolonging a cycle life of the lithium metal battery.

In various embodiments, in a direction of the lithium buffer layer away from the lithium metal, a contact angle of molten lithium on a cross section of the lithium buffer layer increases in a continuous gradient. For the cross section of the lithium buffer layer, by taking a contact surface of the lithium buffer layer with the lithium metal as a first surface, a section of the lithium buffer layer parallel to the first surface is the cross section of the lithium buffer layer.

In the present disclosure, the cross section of the lithium buffer layer can be obtained with a variety of testing methods well known in the art. Specifically, a method such as laser ion cutting or blade cutting may be used.

The contact angle of molten lithium on the cross section of the lithium buffer layer can be determined as follows: Molten lithium metal is added dropwise onto a cross section of a lithium buffer layer, and a special measuring instrument for measuring a surface contact angle (such as a commercially available contact angle measuring instrument from Krüss company, Germany) is used for measurement. The contact angle is defined as an included angle between a tangent to a solid-liquid interface and a tangent to a liquid-gas interface at a junction of solid, liquid, and gas phases. The contact angle of molten lithium on the cross section of the lithium buffer layer reflects wettability of the molten lithium metal on the cross section of the lithium buffer layer, that is, ability of the molten lithium metal to spread or aggregate on the cross section of the lithium buffer layer. The contact angle of molten lithium on the cross section of the lithium buffer layer is also a reflection of the lithiophilicity of the cross section. A smaller contact angle of molten lithium on the cross section of the lithium buffer layer indicates better wettability of the molten lithium metal on the cross section and better lithiophilicity of the cross section; and a larger contact angle of molten lithium on the cross section of the lithium buffer layer indicates worse wettability of the molten lithium metal on the cross section, which means weaker lithiophilicity of the cross section. FIG. 1 is a schematic diagram of a contact angle θ of molten lithium on a cross section of a lithium buffer layer in a composite lithium metal negative electrode according to an embodiment of the present disclosure, where FIG. 1-A shows a case with θ smaller than 90°, and FIG. 1-B shows a case with θ greater than 90°.

In this embodiment, a surface of the lithium buffer layer close to the lithium metal is defined as an inner surface, a surface of the lithium buffer layer away from the lithium metal is defined as an outer surface, and a contact angle of molten lithium on the inner or outer surface of the lithium buffer layer is determined. Similarly, the contact angle of molten lithium on the inner or outer surface of the lithium buffer layer may be determined as follows: Molten lithium metal is added dropwise onto the inner or outer surface of the lithium buffer layer, and a special measuring instrument for measuring a surface contact angle (for example, a commercially available contact angle measuring instrument from Krüss company, Germany may be used) is used for measurement.

In some embodiments, the contact angle of molten lithium on the inner surface of the lithium buffer layer is 0°-90°. The contact angle of molten lithium on the outer surface of the lithium buffer layer is 90°-180°, In this case, the wettability of the molten lithium metal on the inner surface of the lithium buffer layer is good, and the inner surface of the lithium buffer layer is a lithiophilic surface; and the wettability of the molten lithium metal on the outer surface of the lithium buffer layer is poor, and the outer surface of the lithium buffer layer is a lithiophobic surface. When the lithium buffer layer has a lithiophilic inner surface and a lithiophobic outer surface, the lithium buffer layer has a good driving force to induce the lithium metal to spontaneously deposit from a lithiophobic side to a lithiophilic side, having a better effect on suppressing growth of lithium dendrites.

In some embodiments, an angle difference Δθ between the contact angle of molten lithium on the outer surface of the lithium buffer layer and the contact angle of molten lithium on the inner surface of the lithium buffer layer is 10°-180°. Preferably, Δθ is 45°-135°. Δθ shows a rate of change of lithiophilic gradient between the inner surface and the outer surface of the lithium buffer layer. The rate of change of lithiophilic gradient affects the driving force of the lithium buffer layer to induce deposition of the lithium metal in a framework of the lithium buffer layer. With Δθ in the defined range in the present disclosure, an obvious change of lithiophilic gradient between the inner and outer surfaces can effectively drive and induce deposition of the lithium metal from the lithiophobic side to the lithiophilic side, and effectively improve deposition utilization of an internal space of the porous framework of the lithium buffer layer.

In some embodiments, the lithiophilic material is selected from one or more of zinc oxide, zinc sulfide, zinc phosphide, zinc nitride, aluminum oxide, aluminum nitride, magnesium oxide, magnesium sulfide, magnesium nitride, copper phosphide, copper nitride, silver oxide, silver sulfide, and boron nitride. Preferably, the lithiophilic material is zinc oxide or silver oxide. The foregoing substances all have good lithiophilicity, and are advantageous choices for the lithiophilic material in the lithium buffer layer of the present disclosure.

In some embodiments, the porous framework satisfies at least one of the following conditions (1) to (3): (1) a thickness of the porous framework is 1-10,000 μm, and preferably, 50-1,000 μm; (2) a porosity of the porous framework is 30%-95%; and (3) a pore size of the porous framework is 0.01-10 μm.

When the thickness of the porous framework is 1-10,000 μm, and preferably, within a range of 50-1,000 μm, the lithium buffer layer may have a good strength and may provide enough internal space for deposition of the lithium metal, which is beneficial to improvement of long-cycling performance of the battery.

When the porosity of the porous framework is 30%-95%, and/or the pore size of the porous framework is 0.01-10 μm, the porous framework has a high specific surface area, which is beneficial to deposition and deintercalation of lithium ions in the framework and also provides sufficient space for deposition of the lithium metal. The porosity of the porous framework refers to a ratio of a total volume of microscopic voids in the porous framework to a total volume of the porous framework. The pore size of the porous framework refers to a diameter of the pores in the porous framework.

In the present disclosure, a thickness of the porous framework has a meaning well known in the art, and may be determined by using an instrument and a method that are well known in the art. For example, the cross-sectional SEM method is used to test thicknesses of 10 regional samples, and an average value thereof is taken.

In the present disclosure, a porosity of the porous framework has a meaning well known in the art, and may be determined by using an instrument and a method that are well known in the art. For example, an AccuPyc II 1340 automatic true densitometer from Micromeritics company, USA is used for testing with reference to the national standard GB/T 24586-2009.

In the present disclosure, the pore size of the porous framework may be determined by using an instrument and a method that are well known in the art. Example test methods may refer to the standards GB/T19587-2017 "Determination of the specific surface area of solids by gas adsorption using the BET method" and GB/T21650.2-2008 "Pore size distribution and porosity of solid materials by mercury porosimetry and gas adsorption method and gas adsorption—Part 2: Analysis of mesopores and macropores by gas adsorption". For example, a TriStar II 3020 instrument from Micromeritics, USA may be used to test the pore size of the porous framework.

Figure 2:
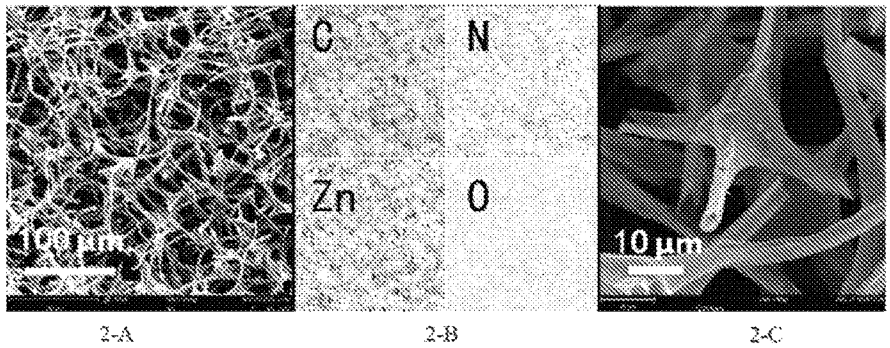
FIG. 2 is an electron microscope graph of a cross section of a lithium buffer layer in a composite lithium metal negative electrode according to an embodiment of the present disclosure.

FIG. 2 is an electron microscope graph of a cross section of a lithium buffer layer in a composite lithium metal negative electrode according to an embodiment of the present disclosure. FIG. 2-A shows morphology of a porous framework inside the lithium buffer layer. FIG. 2-B shows distributions of elements C, N, Zn, and O in a cross section of the lithium buffer layer, and it can be seen that two elements, Zn and O, are densely distributed within the lithium buffer layer. FIG. 2-C is an enlarged view of FIG. 1-A, and it can be seen that there is no obvious precipitation of large ZnO particles on the porous framework, indicating that ZnO is uniformly distributed in the porous framework in a form of small particles.

Figure 3:
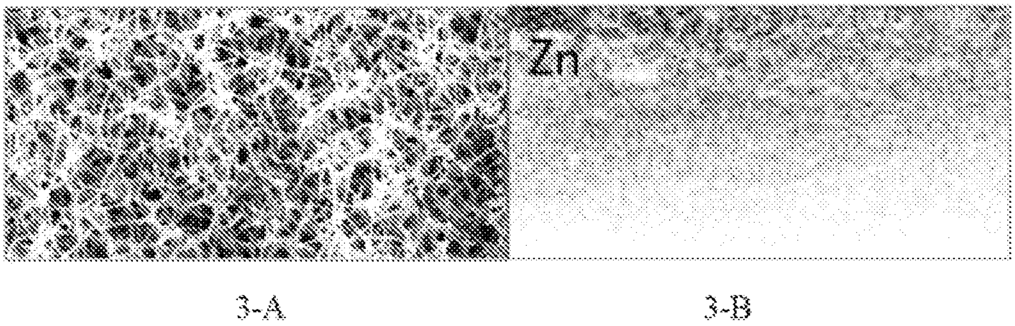
FIG. 3 is an electron microscope graph of a longitudinal section of a lithium buffer layer in a composite lithium metal negative electrode according to an embodiment of the present disclosure.

FIG. 3 is an electron microscope graph of a longitudinal section of a lithium buffer layer according to an embodiment of the present disclosure. FIG. 3-A shows morphology of a longitudinal section of the lithium buffer layer, and it can be seen that a gradient distribution of a lithiophilic material in a porous framework has no effect on an overall structure of the porous framework. FIG. 3-B shows a distribution of element Zn in a longitudinal section of the lithium buffer layer, where a surface with a higher element Zn distribution density is an inner surface of the lithium buffer layer, and a surface with a smaller element Zn distribution density is an outer surface of the lithium buffer layer, and it can be seen that the distribution density of element Zn in the porous framework changes in a continuous gradient.

Preparation of Composite Lithium Metal Negative Electrode

In some embodiments, a preparation method of a composite lithium metal negative electrode is provided and includes the following steps: dissolving a precursor of a lithiophilic material in a solvent to obtain a solution of the precursor of the lithiophilic material; soaking one surface of a porous framework substrate in the solution of the precursor of the lithiophilic material, and taking out the substrate for drying, to obtain a porous framework substrate loaded with the precursor of the lithiophilic material; subjecting the porous framework substrate loaded with the precursor of the lithiophilic material to a sintering treatment and to an optional sulfiding treatment, phosphating treatment, or nitriding treatment, to obtain a lithium buffer layer; and pressing the lithium buffer layer onto at least one surface of the lithium metal, and integrating the surface of the porous framework soaked in the solution of the precursor of the lithiophilic material with the lithium metal, to prepare a composite lithium metal negative electrode.

In some embodiments, the precursor of the lithiophilic material is selected from an organic or inorganic salt containing zinc, aluminum, magnesium, copper, silver or boron. Preferably, the organic salt is selected from bisfluorosulfonimide salt (such as ZnFSI) and/or bistrifluoromethylsulfonimide salt (such as ZnTFSI and AgTFSI); and the inorganic salt is selected from one or more of acetate, nitrate, sulfate, thiosulfate, or meta-aluminate.

In some embodiments, the solvent for dissolving the precursor of the lithiophilic material is selected from one or more of water, ethanol, DMF, or NMP.

In some embodiments, the porous framework substrate is selected from one or more of melamine foam, polyurethane, polyethylene, polystyrene, polyvinyl chloride, polypropylene, polyacetylene, polythiophene, polypyrrole, polyaniline, pure carbon, carbon cloth, or carbon paper, and among them, polyacetylene, polythiophene, polypyrrole, polyaniline, pure carbon, carbon cloth, or carbon paper is inherently conductive. The melamine foam, polyurethane, polyethylene, polystyrene, polyvinyl chloride, and polypropylene are not inherently conductive themselves, and can obtain conductivity after high temperature sintering. All of the foregoing porous framework substrates may be used to prepare the composite lithium metal negative electrode of the present disclosure. A final conductive porous framework in the composite lithium metal negative electrode may provide sufficient migration channels for deposition and deintercalation of lithium ions, promote induction of the lithium metal deposition by the lithium buffer layer, and improve a cycle life of the battery.

In some embodiments, one surface of the porous framework substrate is soaked in the solution of the precursor of the lithiophilic material for 2-360 minutes. Preferably, the soaking time is 30-60 minutes. The soaking time affects diffusion of the solution of the precursor of the lithiophilic material inside the porous framework substrate. The range of soaking time provided in the present disclosure helps to ensure that a rate of change of lithiophilic gradient in the lithium buffer layer is within an appropriate range, thereby effectively playing a role in improving the cycling performance of the lithium secondary battery.

In some embodiments, the sintering treatment is performed in an inert gas environment. A sintering time is preferably 0.5-6 hours. More preferably, a sintering time is 1-2 hours. A sintering temperature is preferably 400-2,500° C. More preferably, a sintering temperature is 800-1,000° C. The foregoing sintering time and sintering temperature conditions may make the porous framework achieve better conductivity and nitrogen in the porous framework is not consumed due to excessive sintering.

In some embodiments, after subjecting the porous framework substrate loaded with the precursor of the lithiophilic material to a sintering treatment, an optional sulfiding treatment, phosphating treatment, or nitriding treatment may be further performed.

The sulfiding treatment performed in some embodiments includes: subjecting a mixture of the lithium buffer layer obtained after the sintering treatment and sulfur powder to sulfiding sintering in an inert gas environment, where preferably, a sulfiding sintering time is 0.5-6 hours, and a sulfiding sintering temperature is 400-1,000° C.

The phosphating treatment performed in some embodiments of the present disclosure includes: subjecting a mixture of the lithium buffer layer obtained after the sintering treatment and phosphorus powder to phosphating sintering in an inert gas environment, where preferably, a phosphating sintering time is 0.5-6 hours, and a phosphating sintering temperature is 400-1,000° C.

The nitriding treatment performed in some embodiments of the present disclosure includes: subjecting the lithium buffer layer obtained after the sintering treatment to nitriding sintering in an $N_2$ or $NH_3$ gas environment; where preferably, a nitriding sintering time is 0.5-6 hours, and a nitriding sintering temperature is 400-1,000° C.

Through the foregoing optional sulfiding, phosphating and nitriding steps, the lithiophilic material in the porous framework may be further transformed from metal oxides or non-metal oxides to metal sulfides, non-metal sulfides, metal phosphides, non-metal phosphides, metal nitrides, or non-metal nitrides. The foregoing sulfides, phosphides, and nitrides can also play a lithiophilic role, guiding lithium metal for uniform deposition in the lithium buffer layer of the present disclosure.

Lithium Secondary Battery

A third aspect of the present disclosure provides a lithium secondary battery, including the composite lithium metal negative electrode according to the first aspect of the present disclosure.

In some embodiments, the lithium secondary battery may include a positive electrode plate, a negative electrode plate, a separator disposed between the positive electrode plate and the negative electrode plate, and an electrolyte. The negative electrode plate is the composite lithium metal negative electrode according to the first aspect of the present disclosure.

The method for preparing the lithium secondary battery should be known to those skilled in the art, for example, each of the positive electrode plate, the separator, and the negative electrode plate may be a layer, and may be cut to a target size and then stacked in order. The stack may be further wound to a target size to form a battery core, and may be further combined with an electrolyte to form an electrochemical energy storage apparatus.

In the lithium secondary battery, the positive electrode plate includes a positive electrode current collector and a positive electrode active substance layer that is provided on at least one surface of the positive electrode current collector. In the positive electrode plate, the positive electrode active substance layer may be provided on one surface of the positive electrode current collector or on two surfaces of the positive electrode current collector.

Those skilled in the art may select a suitable method for preparing the positive electrode plate. For example, the following steps may be included: mixing the positive electrode material, a binder, and a conductive agent to form a slurry, and applying the slurry on the positive electrode current collector.

There is no special limitation on the specific types of the positive electrode active substance, as long as the substance intercalates and deintercalates lithium ions. The positive electrode active substance may be either a layered structural material to diffuse lithium ions in a two-dimensional space, or a spinel structure to diffuse lithium ions in a three-dimensional space. Preferably, the positive electrode active substance may be selected from one or more of lithium transition metal oxides and compounds obtained by adding other transition metals or non-transition metals or non-metals to the lithium transition metal oxides. Specifically, the positive electrode active substance may be preferably selected from one or more of lithium cobalt oxides, lithium nickel oxides, lithium manganese oxides, lithium nickel manganese oxides, lithium nickel cobalt manganese oxides, lithium nickel cobalt aluminum oxides, and lithium-containing phosphates with an olivine structure.

A general formula of lithium-containing phosphates with an olivine structure may be $LiFe_{1-x-y}Mn_xM'_yPO_4$, where $0 \le x \le 1$, $0 \le y < 1$, $0 \le x+y \le 1$, M' is selected from one or more of transitional metal elements or non-transitional metal elements other than Fe and Mn, and M' is preferably selected from one or more of Cr, Mg, Ti, Al, Zn, W, Nb, and Zr. Preferably, the lithium-containing phosphate with an olivine structure is selected from one or more of lithium iron phosphate, lithium manganese phosphate, and lithium manganese iron phosphate.

The lithium transition metal oxide is selected from one or more of $LiCoO_2$, $LiMnO_2$, $LiNiO_2$, $LiMn_2O_4$, $LiNi_xCo_yMn_{1-x-y}O_2$, $LiNi_xCo_yAl_{1-x-y}O_2$, and $LiNi_xMn_{2-x}O_4$, where $0<x<1$, $0<y<1$, and $0<x+y<1$. Preferably, the lithium transition metal oxide is selected from one or more of $LiCoO_2$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.15}Mn_{0.05}O_2$, $LiNi_{0.8}Co_{0.15}Al_{0.05}O_2$, $LiNi_{0.5}Mn_{1.5}O_4$, and $LiMn_2O_4$.

In the positive electrode plate, the positive electrode active substance layer may further include a conductive agent and a binder. Types or percentages of the conductive agent and the binder are not specifically limited, and may be selected based on an actual requirement. The binder typically includes a fluorine-containing polyolefin binder. With respect to the fluorine-containing polyolefin binder, water is usually a good solvent. In other words, the fluorine-containing polyolefin binder usually exhibits good solubility in water. For example, the fluorine-containing polyolefin binder may include but is not limited to polyvinylidene fluoride (PVDF), vinylidene fluoride copolymer or modified (for example, modified by carboxylic acid, acrylic acid, or acrylonitrile) derivatives thereof. In the positive electrode material layer, for the mass percentage of the binder, the used amount of the binder may not be too high because of the poor conductivity of the binder. Preferably, the mass percentage of the binder in the positive electrode active substance layer is less than or equal to 2 wt %, so as to obtain relatively low impedance of the electrode plate. The conductive agent of the positive electrode plate may be various conductive agents suitable for lithium-ion (secondary) batteries in the art, and for example, may include but is not limited to one or more of acetylene black, conductive carbon black, vapor grown carbon fiber (VGCF), carbon nanotubes (CNT), Ketjen black, and the like. A weight of the conductive agent may be 1 wt % to 10 wt % of a total mass of the positive electrode material layer. More preferably, a weight ratio of the conductive agent to the positive electrode active substance in the positive electrode plate is greater than or equal to 1.5:95.5.

In the positive electrode pate, the positive electrode current collector is also not limited to any specific type, and may be selected based on an actual requirement. The positive electrode current collector may usually be a layer. The positive electrode current collector may usually be a structure or a part that can collect current. The positive electrode current collector may be various materials suitable for serving as a positive electrode current collector of an electrochemical energy storage apparatus in the art. For example, the positive electrode current collector may include but is not limited to a metal foil, and more specifically, may include but is not limited to a nickel foil or an aluminum foil.

In the lithium secondary battery, the separator may be various materials suitable for a separator of an electrochemical energy storage apparatus in the art. For example, the separator may include but is not limited to one or more of polyethylene, polypropylene, polyvinylidene fluoride, kevlar, polyethylene terephthalate, polytetrafluoroethylene, polyacrylonitrile, polyimide, polyamide, polyester, and natural fibers.

In the lithium secondary battery, the electrolyte may be various electrolytes suitable for an electrochemical energy storage apparatus in the art. For example, the electrolyte usually includes an electrolytic salt and a solvent, and the electrolytic salt may usually include a lithium salt. More specifically, the lithium salt may be an inorganic lithium salt and/or organic lithium salt, and may specifically include but is not limited to one or more of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, a concentration of the electrolyte may be 0.8 mol/L to 1.5 mol/L. The solvent may be various solvents suitable for an electrolyte of an electrochemical energy storage apparatus in the art. The solvent of the electrolyte is usually a non-aqueous solvent, and preferably, an organic solvent, and may specifically include but is not limited to one or more of ethylene carbonate, propylene carbonate, butylene carbonate, prenyl carbonate, dimethyl carbonate, diethyl carbonate, dipropyl carbonate, ethyl methyl carbonate, or halogenated derivatives thereof.

Figure 4:
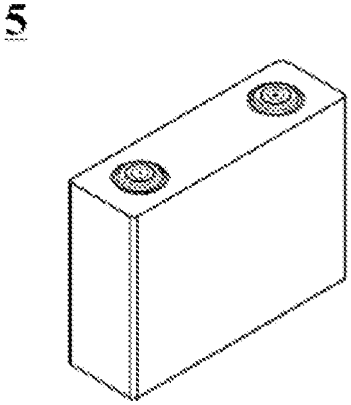
FIG. 4 is a three-dimensional diagram of a lithium secondary battery according to a specific embodiment of the present disclosure.
Figure 5:
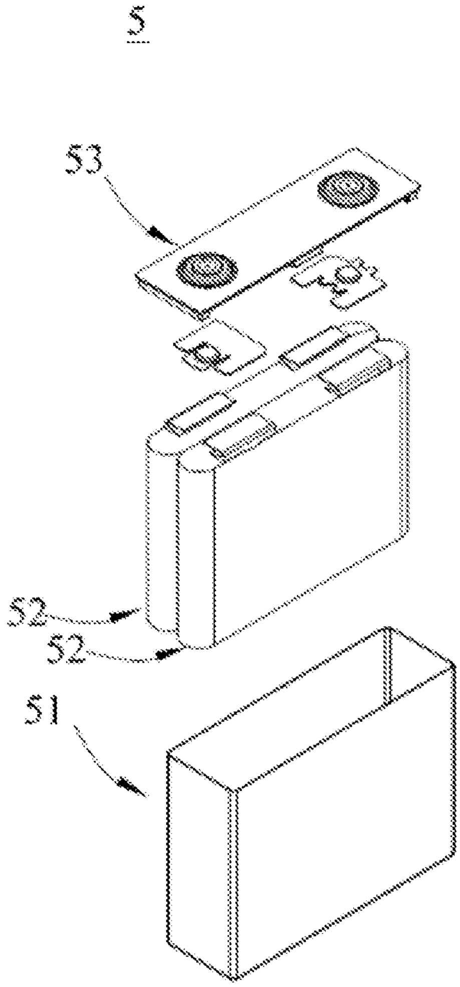
FIG. 5 is an exploded view of the lithium secondary battery in FIG. 4.

FIG. 4 is a three-dimensional diagram of a lithium secondary battery according to a specific embodiment of the present disclosure. FIG. 5 is an exploded view of the lithium secondary battery in FIG. 4. Referring to FIG. 4 and FIG. 5, the lithium secondary battery 5 (hereinafter referred to as the battery cell 5) according to the present disclosure includes an outer package 51, an electrode assembly 52, a top cover assembly 53, and an electrolyte (not shown). The electrode assembly 52 is accommodated in the housing 51. The electrode assemblies 52 is not limited in quantity, and the quantity may be one or more.

It should be noted that the battery cell 5 in FIG. 4 is a tank type battery, but is not limited thereto in the present disclosure. The battery cell 5 may be a bag type battery, which means that the housing 51 is replaced with a metal plastic film and the top cover assembly 53 is eliminated.

Figure 6:
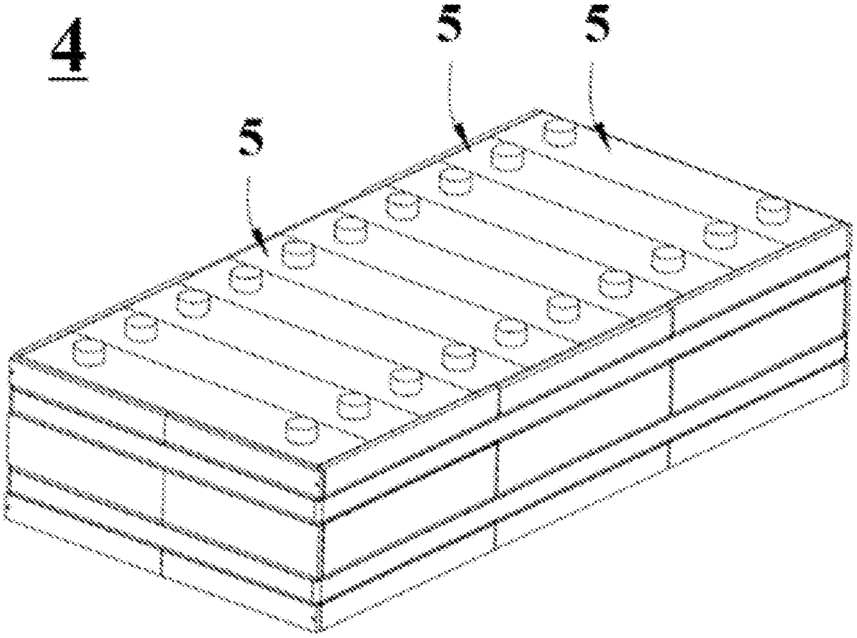
FIG. 6 is a three-dimensional diagram of a battery module according to a specific embodiment of the present disclosure.

In some embodiments, lithium secondary batteries may be combined to assemble a battery module, and the battery module may include a plurality of lithium secondary batteries. The specific quantity may be adjusted based on a use case and capacity of the battery module. FIG. 6 is a three-dimensional diagram of a battery module 4 used as an example. Referring to FIG. 6, in the battery module 4, a plurality of lithium secondary batteries 5 may be sequentially arranged in a length direction of the battery module 4. Certainly, the plurality of lithium secondary batteries 5 may alternatively be arranged in any other manner. Further, the plurality of lithium secondary batteries 5 may be fixed by using fasteners. Optionally, the battery module 4 may further include a housing with an accommodating space, and the plurality of lithium secondary batteries 5 are accommodated in the accommodating space.

Figure 7:
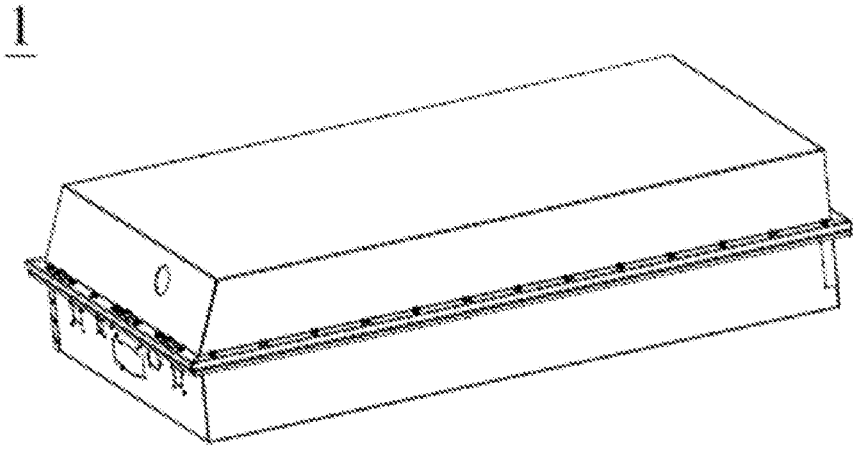
FIG. 7 is a three-dimensional diagram of a battery pack according to a specific embodiment of the present disclosure.
Figure 8:
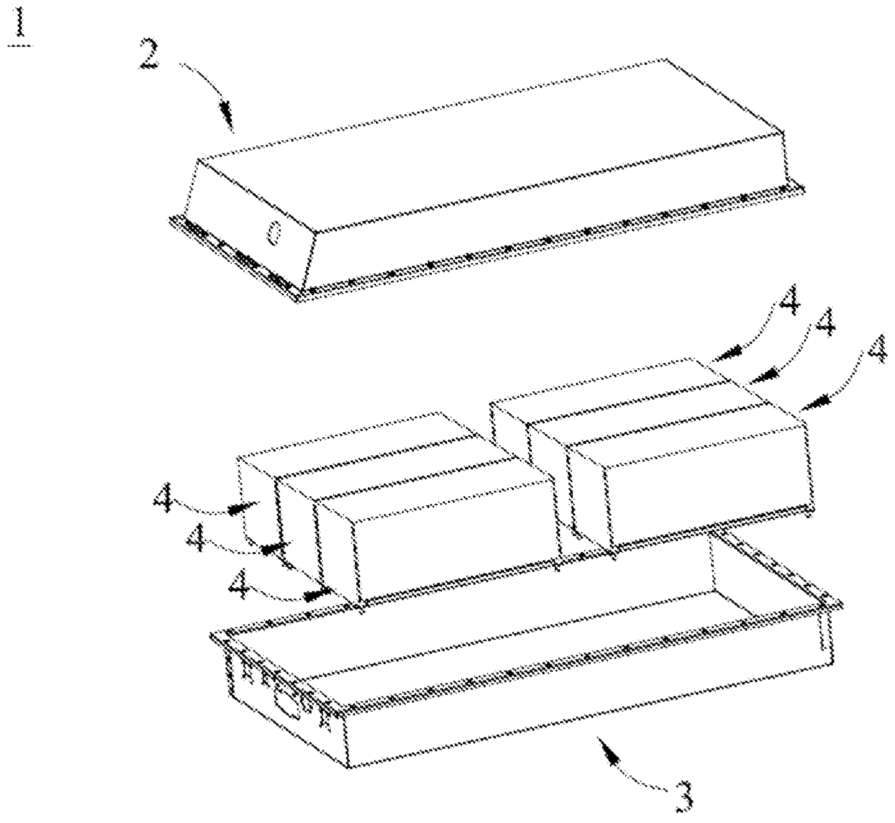
FIG. 8 is an exploded view of the battery pack in FIG. 7.

In some embodiments, the battery module may be further assembled into a battery pack, and a quantity of battery modules included in the battery pack may be adjusted based on application and capacity of the battery pack. FIG. 7 is a three-dimensional diagram of a battery pack 1 used as an example. FIG. 8 is an exploded view of the battery pack in FIG. 7. Referring to FIG. 7 and FIG. 8, the battery pack 1 may include a battery box and a plurality of battery modules 4 disposed in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

Apparatus

A fourth aspect of the present disclosure provides an apparatus, including the lithium secondary battery according to the third aspect of the present disclosure, where the lithium secondary battery is used as a power source of the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium secondary battery, a battery module, or a battery pack may be selected for the apparatus according to requirements for using the apparatus.

Figure 9:
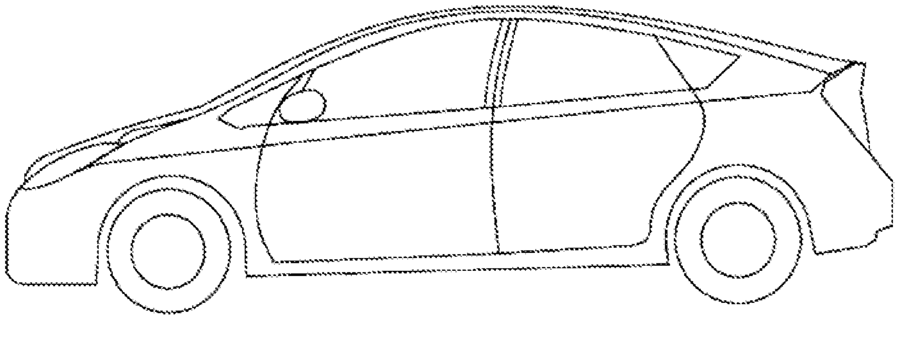
FIG. 9 is a schematic diagram of an apparatus according to a specific embodiment of the present disclosure.

FIG. 9 is a schematic diagram of an apparatus according to a specific embodiment of the present disclosure. The apparatus may be a battery electric vehicle, a hybrid electric vehicle, a plug-in hybrid electric vehicle, or the like. To meet a requirement of the apparatus for high power and high energy density of the lithium secondary battery (that is, the secondary battery in the present disclosure), a battery pack or a battery module may be used.

In another example, the apparatus may be a mobile phone, a tablet computer, a notebook computer, or the like. The apparatus usually requires lightness and thinness, and the lithium secondary battery (that is, the secondary battery in the present disclosure) may be used as a power source.

The following further describes advantages of the present disclosure with reference to specific examples. It should be understood that these examples are merely used to describe the present disclosure but not to limit the scope of the present disclosure. Unless otherwise specified, various parameters in this specification have general meanings well known in the art, and may be measured by using methods well known in the art. For example, they may be tested in methods provided in examples of the present disclosure. In addition, preferred ranges and options of different parameters provided in various preferred examples may be randomly combined, and combinations thus obtained are all considered to fall within the disclosed scope of the present disclosure.

(1) Influence of Material and Preparation Process of Lithium Buffer Layer on Technical Effects of the Present Disclosure Examples 1 to 38

Preparing a Composite Lithium Metal Negative Electrode

A precursor of a lithiophilic material was dissolved in a solvent to obtain a solution of the precursor of the lithiophilic material; one surface of a porous framework substrate was soaked in the solution of the precursor of the lithiophilic material for several hours; the soaked porous framework substrate was taken out of the solution of the precursor of the lithiophilic material, placed in an oven and dried at 80° C. for 12 hours; then the porous framework substrate was placed into a tube furnace and sintered in an inert atmosphere to obtain a lithium buffer layer; and the lithium buffer layer was pressed onto at least one surface of lithium metal, and the surface of the porous framework soaked in the solution of the precursor of the lithiophilic material was integrated with the lithium metal, to prepare a composite lithium metal negative electrode.

A positive electrode plate, a separator, and an electrolyte were prepared by using the conventional methods in the art.

Positive electrode plate: $LiNi_{0.8}Co_{0.1}Mn_{0.1}O_2$, conductive carbon as a conductive agent, and polyvinylidene fluoride (PVDF) as a binder were mixed well at a mass ratio of 96:2:2, to prepare a positive electrode slurry for lithium-ion batteries with a specified viscosity. The positive electrode slurry was applied on a current collector aluminum foil which was dried at 85° C. and cold pressed, then trimmed, cut, slit, and dried under a vacuum condition at a temperature of 85° C. for 4 hours, and welded with a tab, thereby preparing a lithium battery positive electrode plate.

Separator: A polyethylene microporous film with a thickness of 16 μm was selected as a porous substrate separator material.

Electrolyte: Lithium hexafluorophosphate was dissolved in a mixed solvent composed of ethylene carbonate, dimethyl carbonate, and ethyl methyl carbonate with a volume ratio 1:1:1 of the three components, to obtain a required electrolyte.

Preparing a Lithium Secondary Battery

The positive electrode plate, the composite lithium metal negative electrode, and the separator spaced between the positive electrode plate and a lithium supplementing negative electrode plate were wound and assembled, and the electrolyte was injected to prepare a lithium ion battery. The lithium ion battery was a soft pack battery with an electrode active area of 40 $cm^2$ and a battery design capacity of 140 mAh.

Comparative Example 1

A difference from the Examples was that lithium metal was directly used as a negative electrode and matched with a ternary positive electrode without a buffer layer to assemble a lithium metal battery.

Comparative Example 2

A difference from the Examples was that melamine foam with a thickness of 200 μm was directly sintered at 800° C. for 2 hours, pressed onto a surface of the lithium metal which then was used as a negative electrode and then matched with a ternary positive electrode, to assemble a lithium metal battery.

Comparative Example 3

A difference from the Examples was that each of two pieces of melamine foam with a thickness of 100 μm was soaked separately in a mixed solution of ethanol and water, with a concentration of zinc acetate at 0.1 M, and in a mixed solution of ethanol and water, with a concentration of zinc acetate at 1 M, and maintained for 720 minutes to ensure that the zinc acetate was fully and uniformly diffused into the melamine foam, without a concentration gradient in a single layer. The soaked melamine foam was placed in an oven, dried at 80° C. overnight, then placed in a tube furnace, sintered in an inert atmosphere at 800° C. for 2 hours, taken out and pressed onto a surface of the lithium metal in sequence. A carbon layer with a higher zinc acetate concentration faced towards the lithium metal side, which meant that a lithium metal protection layer was also added on the surface of the lithium metal, and the protection layer also had a lithiophilic gradient, but this lithiophilic gradient was discontinuous. The foregoing composite lithium metal negative electrode is matched with a ternary positive electrode to assemble a lithium metal battery.

Specific parameters of Examples 1 to 38 and Comparative Examples 1 to 3 are shown in Table 1.

Cycling Performance Test:

The specific test method was as follows: at 25° C., using constant-current charging and constant-current discharging in a charging and discharging voltage range of 2.8-4.3V, with a charging and discharging rate of 0.2 C, and an initial capacity of the battery recorded as $C_0$, where completion of one full charge and full discharge was recorded as one cycle; and performing charge and discharge according to the foregoing method, testing the capacity of the battery after each cycle until the capacity of the battery is 80%*$C_0$, and recording the number of cycles in this case.

Battery cycling performance test results of Examples 1 to 38 and Comparative Examples 1 to 3 are shown in Table 2.

TABLE 1

| Code | Porous substrate | Substrate thickness | Soaking solution | Soaking solute | Soaking time | Sintering temperature | Carbonation time |
|---|---|---|---|---|---|---|---|
| Example 1 | Melamine foam | 200 μm | Water/ethanol | Zinc acetate | 1 h | 800° C. | 2 h |
| Example 2 | Melamine foam | 200 μm | Water/ethanol | Magnesium acetate | 1 h | 800° C. | 2 h |
| Example 3 | Melamine foam | 200 μm | Water/ethanol | Zinc nitrate | 1 h | 800° C. | 2 h |
| Example 4 | Melamine foam | 200 μm | Water/ethanol | Aluminum nitrate | 1 h | 800° C. | 2 h |
| Example 5 | Melamine foam | 200 μm | Water/ethanol | Silver nitrate | 1 h | 800° C. | 2 h |
| Example 6 | Melamine foam | 200 μm | DMF | Zinc acetate | 1 h | 800° C. | 2 h |
| Example 7 | Melamine foam | 200 μm | NMP | Zinc acetate | 1 h | 800° C. | 2 h |
| Example 8 | Melamine foam | 200 μm | Acetone | Zinc acetate | 1 h | 800° C. | 2 h |
| Example 9 | Melamine foam | 200 μm | Tetrahydrofuran | Zinc acetate | 1 h | 800° C. | 2 h |
| Example 10 | Polyurethane foam | 200 μm | Water/ethanol | Zinc acetate | 1 h | 800° C. | 2 h |
| Example 11 | Polyethylene foam | 200 μm | Water/ethanol | Zinc acetate | 1 h | 800° C. | 2 h |
| Example 12 | Polyaniline | 200 μm | Water/ethanol | Zinc acetate | 1 h | 800° C. | 2 h |
| Example 13 | Carbon cloth | 200 μm | Water/ethanol | Zinc acetate | 1 h | 800° C. | 2 h |
| Example 14 | Melamine foam | 200 μm | Water/ethanol | Zinc acetate | 1 min | 800° C. | 2 h |
| Example 15 | Melamine foam | 200 μm | Water/ethanol | Zinc acetate | 2 min | 800° C. | 2 h |
| Example 16 | Melamine foam | 200 μm | Water/ethanol | Zinc acetate | 30 min | 800° C. | 2 h |
| Example 17 | Melamine foam | 200 μm | Water/ethanol | Zinc acetate | 120 min | 800° C. | 2 h |
| Example 18 | Melamine foam | 200 μm | Water/ethanol | Zinc acetate | 360 min | 800° C. | 2 h |
| Example 19 | Melamine foam | 200 μm | Water/ethanol | Zinc acetate | 720 min | 800° C. | 2 h |
| Example 20 | Melamine foam | 200 μm | Water/ethanol | Zinc acetate | 1 h | 200° C | 2 h |
| Example 21 | Melamine foam | 200 μm | Water/ethanol | Zinc acetate | 1 h | 400° C | 2 h |
| Example 22 | Melamine foam | 200 μm | Water/ethanol | Zinc acetate | 1 h | 1,000° C. | 2 h |
| Example 23 | Melamine foam | 200 μm | Water/ethanol | Zinc acetate | 1 h | 1,500° C. | 2 h |
| Example 24 | Melamine foam | 200 μm | Water/ethanol | Zinc acetate | 1 h | 2000° C. | 2 h |
| Example 25 | Melamine foam | 200 μm | Water/ethanol | Zinc acetate | 1 h | 2,500° C. | 2 h |
| Example 26 | Melamine foam | 200 μm | Water/ethanol | Zinc acetate | 1 h | 800° C. | 0.1 h |
| Example 27 | Melamine foam | 200 μm | Water/ethanol | Zinc acetate | 1 h | 800° C. | 0.5 h |
| Example 28 | Melamine foam | 200 μm | Water/ethanol | Zinc acetate | 1 h | 800° C. | 1 h |
| Example 29 | Melamine foam | 200 μm | Water/ethanol | Zinc acetate | 1 h | 800° C. | 4 h |
| Example 30 | Melamine foam | 200 μm | Water/ethanol | Zinc acetate | 1 h | 800° C. | 6 h |
| Example 31 | Melamine foam | 200 μm | Water/ethanol | Zinc acetate | 1 h | 800° C. | 12 h |
| Example 32 | Melamine foam | 0.1 μm | Water/ethanol | Zinc acetate | 1 h | 800° C. | 2 h |
| Example 33 | Melamine foam | 50 μm | Water/ethanol | Zinc acetate | 1 h | 800° C. | 2 h |
| Example 34 | Melamine foam | 100 μm | Water/ethanol | Zinc acetate | 1 h | 800° C. | 2 h |
| Example 35 | Melamine foam | 500 μm | Water/ethanol | Zinc acetate | 1 h | 800° C. | 2 h |
| Example 36 | Melamine foam | 1,000 μm | Water/ethanol | Zinc acetate | 1 h | 800° C. | 2 h |
| Example 37 | Melamine foam | 10,000 μm | Water/ethanol | Zinc acetate | 1 h | 800° C. | 2 h |

TABLE 1-continued

| Code | Porous substrate | Substrate thickness | Soaking solution | Soaking solute | Soaking time | Sintering temperature | Carbonation time |
|---|---|---|---|---|---|---|---|
| Example 38 | Melamine foam | 50,000 μm | Water/ethanol | Zinc acetate | 1 h | 800° C. | 2 h |
| Comparative Example 1 | None | None | None | None | None | None | 2 h |
| Comparative Example 2 | Melamine foam | 200 μm | None | None | None | 800° C. | 2 h |
| Comparative Example 3 | Melamine foam | 200 μm | Water/ethanol | Zinc acetate | 12 h | 800° C. | 2 h |

TABLE 2

| Code | Number of cycles (capacity decay to 80%) |
|---|---|
| Example 1 | 202 |
| Example 2 | 198 |
| Example 3 | 205 |
| Example 4 | 196 |
| Example 5 | 212 |
| Example 6 | 195 |
| Example 7 | 192 |
| Example 8 | 198 |
| Example 9 | 203 |
| Example 10 | 187 |
| Example 11 | 194 |
| Example 12 | 195 |
| Example 13 | 206 |
| Example 14 | 136 |
| Example 15 | 142 |
| Example 16 | 191 |
| Example 17 | 172 |
| Example 18 | 157 |
| Example 19 | 138 |
| Example 20 | 56 |
| Example 21 | 105 |
| Example 22 | 186 |
| Example 23 | 168 |
| Example 24 | 164 |
| Example 25 | 160 |
| Example 26 | 177 |
| Example 27 | 182 |
| Example 28 | 193 |
| Example 29 | 188 |
| Example 30 | 185 |
| Example 31 | 182 |
| Example 32 | 132 |
| Example 33 | 156 |
| Example 34 | 162 |
| Example 35 | 185 |
| Example 36 | 180 |
| Example 37 | 125 |
| Example 38 | 92 |
| Comparative Example 1 | 41 |
| Comparative Example 2 | 134 |
| Comparative Example 3 | 145 |

Analysis of Battery Cycling Performance Test Results:

(1) Examples 1 to 13 and Comparative Examples 1 to 3

Examples 1 to 13 showed that adding the lithium buffer layer of the present disclosure on a surface of the lithium metal negative electrode for the lithium secondary battery has improved the battery cycling performance of the lithium secondary battery. It can be seen from Table 1 that different precursors of the lithiophilic material were selected for preparation of the solutions of the precursors of the lithiophilic material in Examples 1 to 5, respectively; different solvents were selected for preparation of the solutions of the precursors of the lithiophilic material in Examples 1 and 6 to 9, respectively; and different porous framework substrates were selected in Examples 1 and 10 to 13, respectively.

It can be seen from Table 2 that the lithium secondary batteries in Examples 1 to 13 were charged and discharged at 0.2 C, and the number of cycles at which the capacity decay to 80% was over 190, or even over 200. In contrast, for the lithium secondary battery in Comparative Example 1, which only used lithium metal as the negative electrode, and was charged and discharged under the same conditions, the number of cycles for capacity decay to 80% was only 41; and for the lithium secondary battery in Comparative Example 2, in which only the porous framework substrate was used and pressed onto the lithium metal to form the negative electrode plate, and was charged and discharged under the same conditions, the number of cycles for capacity decay to 80% was just 134. The above comparative data showed that, in the embodiments of the present disclosure, the lithium buffer layers prepared by using different types of lithiophilic materials and different types of porous frameworks can induce uniform deposition of the lithium metal in the lithium buffer layer, and prevent lithium ions from gaining electrons on the outer surface of the lithium buffer layer, thereby improving the cycling performance of the lithium secondary battery.

Figure 10:
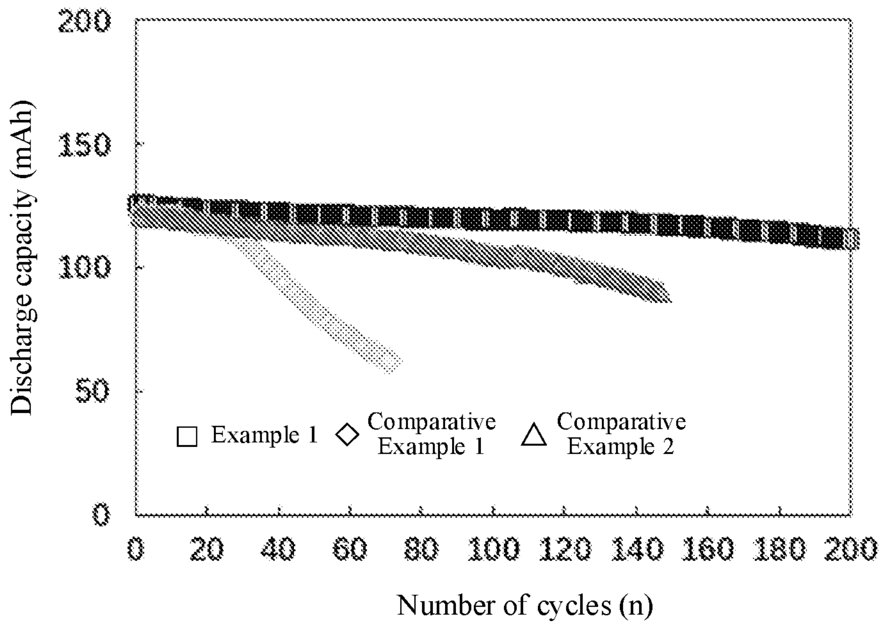
FIG. 10 is a comparison diagram of cycling performance of lithium secondary batteries in Example 1 and Comparative Examples 1 and 2 of the present disclosure.

FIG. 10 shows the cycling performance of the lithium secondary battery in Example 1 and Comparative Examples 1 and 2. It can be seen from FIG. 10 that the cycling performance in Example 1 is significantly better than that in Comparative Examples 1 and 2.

In addition, in Comparative Example 3, a buffer layer with a discontinuous lithiophilic gradient was formed on a surface of the lithium metal negative electrode. In Comparative Example 3, the buffer layer added on the surface of the lithium metal negative electrode was composed of two porous framework layers with different distribution densities of a lithiophilic material. During cycling of the battery, uneven deposition of the lithium metal in the porous framework layer with a same distribution density of the lithiophilic material was still inevitable. It can be seen from Table 2 that, under the same conditions, for the lithium secondary battery in Comparative Example 3, the number of cycles for capacity decay to 80% was only 145, which was significantly lower than that in Example 1 of the present disclosure; and that the inhibition effect on lithium dendrites and the improvement effect on the battery cycle life in Comparative Example 3 were both weaker than those in the present disclosure.

(2) Examples 1 and 14 to 19

Examples 1 and 14 to 19 showed influence of the soaking time of one surface of the porous framework substrate in the solution of the precursor of the lithiophilic material on technical effects of the present disclosure.

It can be learned from Table 1 that in all of Examples 1 and 14 to 19, melamine foam with a thickness of 200 μm was used as the porous framework substrate, and one of its surfaces was soaked in a mixed solution of ethanol and water, with a concentration of zinc acetate at 1 M; and the difference was only in the soaking times which were 1 hour, 1 minute, 2 minutes, 30 minutes, 120 minutes, 360 minutes, and 720 minutes in sequence. All other materials and preparation process parameters were the same. It can be seen from Table 2 that as the soaking time increased, the cycling performance of lithium secondary batteries showed an upward and then downward changing trend.

When the soaking time was too short (as in Example 14), there was no enough time for the solution of the precursor of the lithiophilic material to diffuse into the porous framework substrate to exert an inhibition effect on the growth of lithium dendrites in the lithium metal negative electrode, resulting in only a slight improvement in the cycling performance of the lithium secondary battery compared to that in Example 2 without an additional lithium buffer layer.

As the soaking time increased, the solution of the precursor of the lithiophilic material diffused through one surface of the porous framework substrate to the interior of the porous framework substrate and gradually formed a continuous concentration distribution gradient in the porous framework substrate, which also resulted in a continuous gradient-reduced lithiophilicity in the lithium buffer layer in the composite lithium metal negative electrode. The inhibition effect of the lithium buffer layer on the lithium dendrites in the lithium metal negative electrode and the induced deposition effect of the lithium buffer layer on lithium metal were gradually obvious, and the improvement effect on the cycling performance of lithium secondary batteries also became significant.

However, it did not mean that the longer the porous framework substrate was soaked in the solution of the precursor of the lithiophilic material, the better the result would be. In Example 1, the soaking time of the porous framework substrate in the solution of the precursor of the lithiophilic material was 1 hour, and the lithium secondary battery had a good cycling performance. If the soaking time was further increased, the solution of the precursor of the lithiophilic material may continue to diffuse and penetrate into the porous framework substrate, which led to the gradual disappearance of the lithiophilic gradient in the porous framework, and made the improvement effect on the cycling performance of the lithium secondary battery also became weak instead. For example, in Example 19, the soaking time of the porous framework substrate in the solution of the precursor of the lithiophilic material was 720 minutes, and the improvement effect on the cycling performance of the lithium secondary battery was not as good as that in Example 1.

Therefore, in the embodiments of the present disclosure, one surface of the porous framework substrate was soaked in the solution of the precursor of the lithiophilic material preferably for 2-360 minutes, and more preferably, for 30-60 minutes.

(3) Examples 1 and 20 to 25

Examples 1 and 20 to 25 showed influence of the temperature conditions, under which the porous framework substrate loaded with the precursor of the lithiophilic material was sintered in an inert atmosphere, on technical effects of the present disclosure.

It can be learned from Table 1 that in Examples 1 and 20 to 25, the sintering temperatures of the porous framework substrate loaded with the solution of the precursor of the lithiophilic material in an inert atmosphere were 800° C., 200° C., 400° C., 1,000° C., and 1,500° C., 2,000° C., and 2,500° C. in sequence, and that other materials and preparation process parameters were the same. It can be seen from Table 2 that as the sintering temperature rose, the cycling performance of lithium secondary batteries showed an upward and then downward changing trend.

When the sintering temperature was low (as in Example 20), the porous framework of the lithium buffer layer did not achieve good conductivity, which was not conducive to the migration and deintercalation of the lithium metal from the buffer layer, resulting in limited improvement of the cycling performance of the lithium secondary battery.

As the sintering temperature rose, the conductivity of the lithium buffer layer was gradually improved. The inhibition effect of the lithium buffer layer on the lithium dendrites in the lithium metal negative electrode and the induced deposition effect of the lithium buffer layer on lithium metal were gradually obvious, and the improvement effect on the cycling performance of lithium secondary batteries has also been enhanced. In Example 1, the sintering temperature of the porous framework substrate loaded with the solution of the precursor of the lithiophilic material in an inert atmosphere was 800° C., and the improvement effect on the cycling performance of lithium secondary battery was significant.

However, an excessively high sintering temperature not only caused energy waste, but also consumed nitrogen in the porous framework, which had a negative effect on the cycling performance of the battery. Therefore, in some embodiments of the present disclosure, the temperature at which the porous framework substrate loaded with the precursor of the lithiophilic material was sintered was preferably 400-2,500° C., and more preferably, 800-1,000° C.

(4) Examples 1 and 26 to 31

Examples 1 and 26 to 31 showed influence of the sintering time, at which the porous framework substrate loaded with the precursor of the lithiophilic material was sintered in an inert atmosphere, on technical effects of the present disclosure.

It can be learned from Table 1 that in Examples 1 and 26 to 31, the sintering times of the porous framework substrates loaded with the solution of the precursor of the lithiophilic material in an inert atmosphere were 2 hours, 0.1 hours, 0.5 hours, 1 hour, 4 hours, 6 hours, and 12 hours in sequence, and that other materials and preparation process parameters were the same. It can be seen from Table 2 that as the sintering time increased, the cycling performance of lithium secondary batteries showed an upward and then downward changing trend.

When the sintering time was too short (as in Example 26), the porous framework of the lithium buffer layer did not achieve good conductivity, which was not conducive to the migration and deintercalation of the lithium metal from the buffer layer, resulting in limited improvement of the cycling performance of the lithium secondary battery.

As the sintering time increased, the conductivity of the lithium buffer layer was gradually improved. The inhibition effect of the lithium buffer layer on the lithium dendrites in the lithium metal negative electrode and the induced deposition effect of the lithium buffer layer on lithium metal were gradually obvious, and the improvement effect on the cycling performance of lithium secondary batteries also became significant. In Example 1, the sintering time of the porous framework substrate loaded with the solution of the precursor of the lithiophilic material in an inert atmosphere was 2 hours, and the improvement effect on the cycling performance of lithium secondary battery was significant.

However, an excessively long sintering time not only caused energy waste, but also consumed nitrogen in the porous framework, which had a negative effect on the cycling performance of the battery. Therefore, in some embodiments of the present disclosure, the porous framework substrate loaded with the precursor of the lithiophilic material was sintered preferably for 0.5-6 hours, and more preferably, for 1-2 hours.

(5) Examples 1 and 32 to 38

Examples 1 and 32 to 38 showed influence of the thickness of the porous framework substrate on technical effects of the present disclosure.

It can be learned from Table 1 that the thicknesses of the porous framework substrate in Examples 1 and 32 to 38 were 0.1 μm, 50 μm, 100 μm, 500 μm, 1,000 μm, 10,000 μm, and 50,000 μm in sequence. All other materials and preparation process parameters were the same. It can be seen from Table 2 that as the thickness of the porous framework substrate increased, the cycling performance of lithium secondary batteries showed an upward and then downward changing trend.

When the thickness of the porous framework substrate was small (as in Example 32), the strength of the porous framework substrate was low. Therefore, use of this porous framework substrate to prepare a lithium buffer layer was not conducive to the long cycling of the battery, resulting in that the effect of improving the cycling performance of the lithium secondary battery was not good enough.

As the thickness of the porous framework substrate increased, the strength of the porous framework substrate was also improved, which was conducive to the long cycling of the battery, and the cycling performance of the lithium secondary battery was further improved. However, it did not mean that the thicker the porous framework substrate was, the better the result would be. When the thickness of the porous framework substrate was too large, this porous framework substrate was used to prepare the lithium buffer layer added on the lithium metal negative electrode, and the battery was assembled by using the lithium metal negative electrode, the electrolyte was consumed seriously due to the excessive thickness of the lithium buffer layer, and the improvement effect of the porous framework substrate on the cycling performance of the lithium secondary battery was not as good as that in Example 1.

Therefore, in some embodiments of the present disclosure, the thickness of the porous framework was 1-10,000 μm, and preferably, 50-1,000 μm.

(2) Influence of the Optional Sulfiding Treatment, Phosphating Treatment, or Nitriding Treatment on Technical Effects of the Present Disclosure Examples 39 to 41

A difference from Example 1 was only that: a mixture of the lithium buffer layer obtained after the sintering treatment and sulfur powder was subjected to sulfiding sintering in an inert gas environment, and it was ensured that an internal environment for sulphation was closed.

Examples 42 to 44

A difference from Example 1 was only that: a mixture of the lithium buffer layer obtained after the sintering treatment and phosphorus powder was subjected to phosphating sintering in an inert gas environment, and it was ensured that an internal environment for phosphation was closed.

Examples 45 to 47

A difference from Example 1 was only that: the lithium buffer layer obtained after the sintering treatment was subjected to nitriding sintering in an $N_2$ or $NH_3$ gas environment.

Process parameters for sulfiding treatment, phosphating treatment, or nitriding treatment and cycling performance of lithium secondary batteries in Examples 39 to 47 are shown in Table 3.

TABLE 3

| Code | Treatment time | Treatment temperature | Number of cycles (capacity decay to 80%) |
|---|---|---|---|
| Example 39 | Sulfiding time: 0.5 hours | Sulfiding temperature: 1,000° C. | 196 |
| Example 40 | Sulfiding time: 3 hours | Sulfiding temperature: 600° C. | 208 |
| Example 41 | Sulfiding time: 6 hours | Sulfiding temperature: 400° C. | 185 |
| Example 42 | Phosphating time: 0.5 hours | Phosphating temperature: 1,000° C. | 198 |
| Example 43 | Phosphating time: 2.5 hours | Phosphating temperature: 800° C. | 211 |
| Example 44 | Phosphating time: 6 hours | Phosphating temperature: 400° C. | 189 |
| Example 45 | Nitriding time: 0.5 hours | Nitriding temperature: 1,000° C. | 192 |
| Example 46 | Nitriding time: 4 hours | Nitriding temperature: 700° C. | 210 |
| Example 47 | Nitriding time: 6 hours | Nitriding temperature: 400° C. | 188 |

It can be learned from Table 3 that through the optional sulfiding, phosphating and nitriding steps, the lithiophilic material in the porous framework was further transformed from metal oxides or non-metal oxides to metal sulfides, non-metal sulfides, metal phosphides, non-metal phosphides, metal nitrides, or non-metal nitrides, and that the technical effects of inducing the uniform deposition of the lithium metal in the lithium buffer layer, inhibiting the growth of lithium dendrites, and improving the cycle life of lithium secondary batteries can also be achieved.

(3) Influence of Angle Difference in Contact Angle of Molten Lithium on Technical Effects of the Present Disclosure Still using Examples 1 to 5, 14 to 19 and Comparative Example 3, the contact angles of molten lithium on the outer surface and the inner surface of the lithium buffer layer were tested separately, and then the angle difference between the two contact angles of molten lithium was calculated to show the influence of the angle difference $\Delta\theta$ between the contact angle of molten lithium on the outer surface of the layer and the contact angle of molten lithium on the inner surface of the lithium buffer layer on technical effects of the present disclosure.

The numbers of the selected Examples, the solute in the solution of the precursor of the lithiophilic material, the time at which the porous framework substrate was soaked in the solution of the precursor of the lithiophilic material, the angle difference between the contact angles of molten lithium on the inner and outer surfaces of the lithium buffer layer, and the cycling performance data of the battery are shown in Table 4.

TABLE 4

| Code | Soaking solute | Soaking time | Contact angle of molten lithium on outer surface of lithium buffer layer | Contact angle of molten lithium on inner surface of lithium buffer layer | Difference between contact angles of molten lithium on two surface | Number of cycles (capacity decay to 80%) |
|---|---|---|---|---|---|---|
| Example 1 | Zinc acetate | 1 h | 162 | 28 | 134 | 202 |
| Example 2 | Magnesium acetate | 1 h | 163 | 32 | 131 | 198 |
| Example 3 | Zinc nitrate | 1 h | 161 | 29 | 132 | 205 |
| Example 4 | Aluminum nitrate | 1 h | 162 | 32 | 130 | 196 |
| Example 5 | Silver nitrate | 1 h | 161 | 29 | 132 | 212 |
| Example 14 | Zinc acetate | 1 min | 163 | 148 | 15 | 136 |
| Example 15 | Zinc acetate | 2 min | 161 | 113 | 48 | 142 |
| Example 16 | Zinc acetate | 30 min | 162 | 57 | 105 | 191 |
| Example 17 | Zinc acetate | 120 min | 123 | 28 | 95 | 172 |
| Example 18 | Zinc acetate | 360 min | 93 | 27 | 66 | 157 |
| Example 19 | Zinc acetate | 720 min | 30 | 28 | 2 | 138 |

Table 4 shows influence of the contact angle of molten lithium on the outer surface of the lithium buffer layer, the contact angle of molten lithium on the inner surface of the lithium buffer layer, and the difference between the contact angles of molten lithium on the two surfaces, on technical effects of the present disclosure.

The contact angle of molten lithium on the inner surface of the lithium buffer layer was preferably 0°-90°, and in this case, the inner surface of the lithium buffer layer had good lithiophilicity. The contact angle of molten lithium on the outer surface of the lithium buffer layer was preferably 90°-180°, and in this case, the outer surface of the lithium buffer layer had weak lithiophilicity or was lithiophobic. Therefore, the lithium buffer layer may induce the lithium metal to spontaneously deposit from the lithiophobic side to the lithiophilic side of the lithium buffer layer and finally uniformly deposit inside the lithium buffer layer.

Furthermore, an angle difference between the contact angle of molten lithium on the outer surface of the lithium buffer layer and the contact angle of molten lithium on the inner surface of the lithium buffer layer was 10°-180°, and preferably, 45°-135°. When the angle difference between the contact angles of molten lithium on the outer surface and the inner surface of the lithium buffer layer was less than 10°, a rate of change of the lithiophilic gradient between the inner and outer surfaces was too small, lack of driving force to induce the lithium metal to deposit from the lithiophobic side to the lithiophilic side. As a more preferred solution, the angle difference of the contact angles of molten lithium between the outer surface and the inner surface of the lithium buffer layer was 45°-135°, so that an obvious lithiophilic gradient change between the inner and outer surfaces can effectively drive and induce deposition of the lithium metal from the lithiophobic side to the lithiophilic side, improve deposition utilization of an internal space of the porous framework of the lithium buffer layer, and effectively suppress the growth of lithium dendrites, effectively improving the cycling performance of the lithium secondary battery.

It can be seen from Table 4 that: in Examples 14 and 15, the contact angle of molten lithium on the inner surface of the lithium buffer layer exceeded 90°, and the lithiophilicity of the inner surface of the lithium buffer layer was relatively weak; and in Example 19, the contact angle of molten lithium on the outer surface of the lithium buffer layer is less than 90°, and the lithiophilicity of the outer surface of the lithium buffer layer is relatively high. Therefore, the cycling performance in Examples 14, 15 and 19 was inferior to that in other Examples. In addition, in Examples 14 and 19, the difference between the contact angles of molten lithium on the two surfaces was too small, and no obvious lithiophilic gradient was formed. Therefore, the cycling performance in Examples 14 and 19 was the least desirable among the Examples in Table 2.

A person skilled in the art may understand that the foregoing definitions or preferred ranges of component selection, component content, and material physicochemical performance parameters in electrochemical active materials in different embodiments of the present disclosure may be randomly combined, and various embodiments obtained through the combination shall still fall within the scope of the present disclosure and shall be considered as a part of content disclosed in this specification.

According to the disclosure and teaching of this specification, those skilled in the art may make further changes or modifications to the foregoing embodiments. Therefore, the present disclosure is not limited to the specific implementations disclosed and described above. Some changes or modifications to the present disclosure shall also fall within the protection scope of the claims of the present disclosure.

In addition, although some specific terms are used in this specification, these terms are used only for ease of description, and do not constitute any limitation on the present disclosure.

The invention claimed is:

1. A composite lithium metal negative electrode, comprising lithium metal and a lithium buffer layer on at least one surface of the lithium metal, wherein, the lithium buffer layer comprises a porous framework and a lithiophilic material, wherein the porous framework is a conductive porous framework, and the lithiophilic material comprises non-metal phosphide; and the lithiophilic material is distributed in the porous framework, and a distribution density of the lithiophilic material in the porous framework decreases in a continuous gradient in a direction of the lithium buffer layer away from the lithium metal.

2. The composite lithium metal negative electrode according to claim 1, wherein in the direction of the lithium buffer layer away from the lithium metal, a contact angle of molten lithium on a cross section of the lithium buffer layer increases in a continuous gradient.

3. The composite lithium metal negative electrode according to claim 2, wherein the lithium buffer layer has an inner surface close to the lithium metal and an outer surface away from the lithium metal, the contact angle of molten lithium on the inner surface of the lithium buffer layer is 0°-90°, and the contact angle of molten lithium on the outer surface of the lithium buffer layer is 90°-180°.

4. The composite lithium metal negative electrode according to claim 3, wherein an angle difference 40 between the contact angle of molten lithium on the outer surface of the lithium buffer layer and the contact angle of molten lithium on the inner surface of the lithium buffer layer is 10°-180°.

5. The composite lithium metal negative electrode according to claim 1, wherein the porous framework satisfies:

(1) a thickness of the porous framework is 1-10,000 μm;

(2) a porosity of the porous framework is 30%-95%; and (3) a pore size of the porous framework is 0.01-10 μm.

6. A lithium secondary battery, characterized by comprising the composite lithium metal negative electrode according to claim 1.

7. An apparatus, characterized by comprising the lithium secondary battery according to claim 6, wherein the lithium secondary battery is used as a power source of the apparatus, or an energy storage unit of the apparatus.

8. The composite lithium metal negative electrode according to claim 1, wherein the lithiophilic material further comprises metal sulfide, the metal sulfide is magnesium sulfide.

9. The composite lithium metal negative electrode according to claim 1, wherein the lithiophilic material further comprises at least one selected from metal nitride, the metal nitride is aluminum nitride.

10. The composite lithium metal negative electrode according to claim 1, wherein the lithiophilic material further comprises metal phosphide, the metal phosphide comprises zinc phosphide.

11. The composite lithium metal negative electrode according to claim 1, wherein the lithiophilic material further comprises at least one selected from metal oxide and non-metal oxide.

12. The composite lithium metal negative electrode according to claim 11, wherein the metal oxide comprises at least one selected from zinc oxide, aluminum oxide, magnesium oxide, and silver oxide.

13. The composite lithium metal negative electrode according to claim 1, wherein the porous framework is formed from a porous framework substrate selected from one or more of melamine foam, polyurethane, polyethylene, polystyrene, polyvinyl chloride, polypropylene, polyacetylene, polythiophene, polypyrrole, and polyaniline.

* * * * *